Sept. 12, 1950 R. J. LAMKIN 2,522,283
GAUGE FOR DETERMINING THE THROW OF CRANKSHAFTS
Filed March 25, 1947
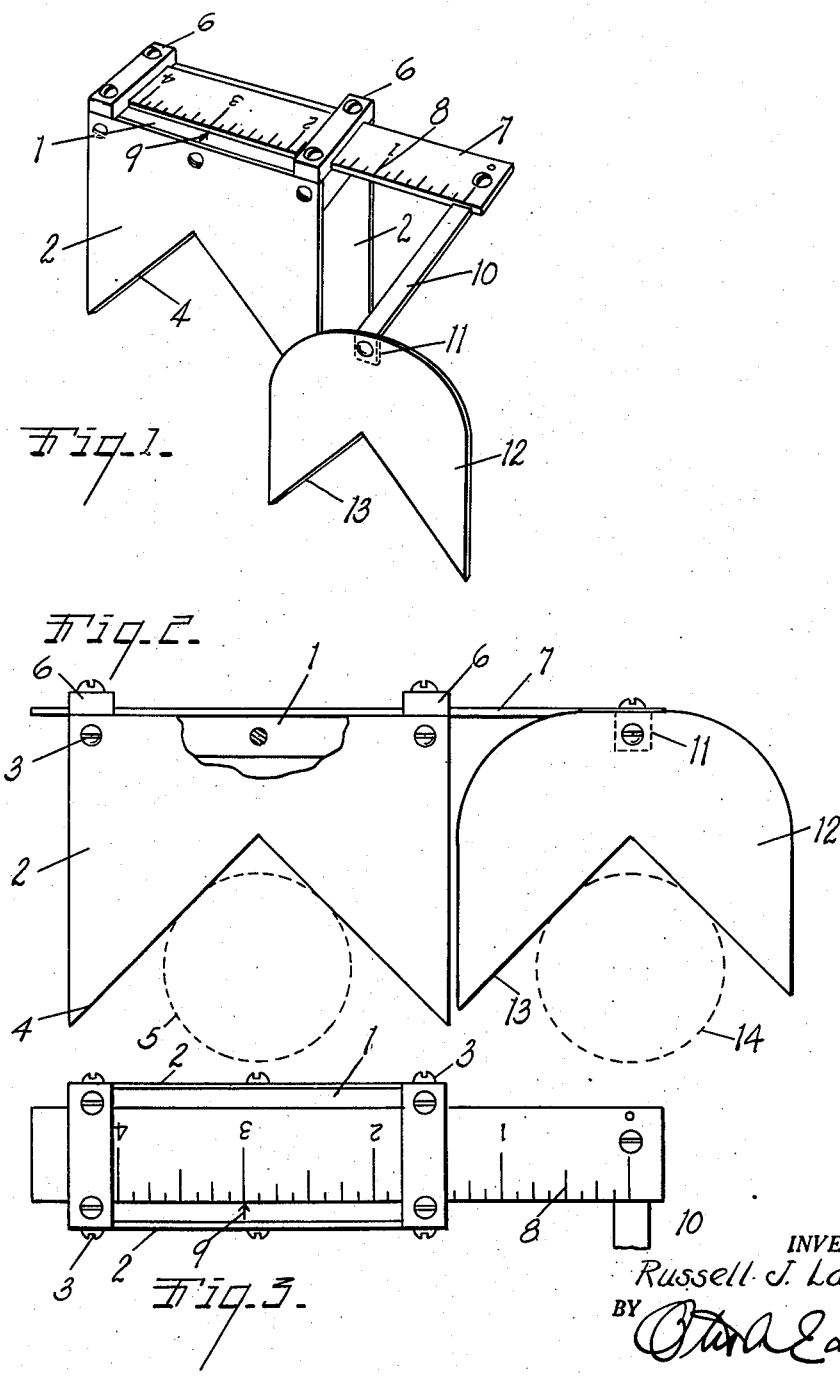
INVENTOR.
Russell J. Lamkin
BY
ATTORNEY.

Patented Sept. 12, 1950

2,522,283

UNITED STATES PATENT OFFICE 2,522,283

GAUGE FOR DETERMINING THE THROW OF CRANKSHAFTS

Russell J. Lamkin, Kalamazoo, Mich.

Application March 25, 1947, Serial No. 737,052

5 Claims. (Cl. 33—174)

This invention relates to improvements in a gauge.

The principal objects of this invention are:

First, to provide a gauge which will conveniently and accurately measure the throw or eccentricity of the crank pins of a crank shaft or cam shaft.

Second, to provide a gauge for measuring the throw of crank shafts or the like which is self-aligning on the crank shaft and easily read.

Third, to provide a gauge for measuring the throw of crank shafts which is extremely simple and inexpensive to manufacture and accurate in its measurements.

Other objects and advantages relating to the details and economies of the invention will be apparent from the following description and claims.

The drawings, of which there is one sheet, illustrate a preferred form of my gauge.

Fig. 1 is a perspective view of the gauge.

Fig. 2 is an elevational view of the gauge partially broken away and in operative position on a crank shaft, the shaft and a crank pin thereof being indicated by dotted lines.

Fig. 3 is a fragmentary plan view of the gauge.

In setting up and adjusting grinding or re-surfacing machines for grinding the main bearings and crank pin bearings of crank shafts, cam shafts and similar objects having eccentrically positioned bearing surfaces, it is necessary to determine the eccentricity of the crank pins with respect to the main bearings of the crank shaft. My gauge is designed to quickly and accurately determine this measurement and to automatically align itself with the axis of the crank shaft when applied thereto.

The gauge comprises a base block 1 having a pair of work engaging plates 2 secured to the opposite edges thereof as by the screws 3. The work engaging plates each define similar notches 4 on their under side which are arranged to engage the main bearings of a crank shaft indicated by the dotted line 5 in Fig. 2. In manufacturing the gauge, care is taken to assure that the opposite edges of the base plate 1 and the work engaging plates 2 are parallel so that when the gauge is applied to the main bearing of a crank shaft, it will be self-aligning due to the engagement of the cylindrical surface of the crank shaft bearing and the notches 4.

The top of the base plate 1 has secured thereto a pair of downwardly opening saddle members 6 which slidingly retain a scale bar 7 on the top of the base plate. The scale bar 7 is provided with measuring indicia as indicated at 8 cooperative with a datum point 9 on the top of the base plate.

The outer end of the scale bar carries a longitudinally extending connecting bar 10, the forward end of which is turned downwardly as at 11 and riveted to a third work engaging plate 12 defining a notch 13 on its under side. Preferably the connecting bar 10 is aligned with the zero point of the indicia scale and the datum point 9 is vertically aligned with the apex of the notches 4. The work engaging plate 12 is held in parallel relationship with the work engaging plate 2 and the scale bar 7 is slidable along the base plate in parallel relationship to the work engaging plates.

By applying the work engaging plates 2 to the main bearing of a crank shaft, the gauge is aligned with the longitudinal axis of the crank shaft and by sliding the scale bar 7 along the base plate 1 until both edges of the notch 13 in the work engaging plate 12 engage the crank pin 14 of the crank shaft, the machinist may readily determine the eccentricity or throw of the crank pin by reading the scale 8. The third work engaging plate being held in parallel relationship with the main work engaging plate, the measurement indicated by the datum point 9 and the indicia marks 8 gives a true and accurate reading of the eccentricity.

My gauge thus described is inexpensive to manufacture having few parts and being adapted to use standard metal scales for the scale bar 7. Preferably the parts of the gauge are all made of steel for long life of the gauge but obviously other materials may be substituted therefore.

I have thus described a highly practical form of my scale so that others may reproduce the same without further description.

Having thus described my invention, what I claim as new and desire to secure by Letters Patent is:

1. A gauge for determining the throw of crank shafts and the like comprising a base plate having parallel side edges, work engaging plates secured to said parallel edges in parallel relationship and defining aligned and similar work engaging notches in the lower edges thereof, a pair of downwardly opening saddle members secured to the top of said base plate and slidably securing a scale bar on the top of said base plate, said scale bar having measuring indicia thereon cooperative with a datum point on said base plate, said datum point being positioned in a vertical plane through the apex of said notches, a connecting bar extending normally from said scale bar and from the zero point of the scale thereon, and a third work engaging plate secured to the end of said connecting bar, said third plate defining a work engaging notch on the lower edge thereof, said work engaging plates all being held in parallel planes.

2. A gauge for determining the throw of crank shafts and the like comprising a base plate having parallel side edges, work engaging plates secured to said parallel edges in parallel relationship and defining similar work engaging notches in the lower edges thereof, a scale bar slidably secured on the top of said base plate, said scale bar having measuring indicia thereon cooperative with a datum point on said base plate, a connecting bar extending normally from said scale bar, and a third work engaging plate secured to said connecting bar and offset from said other plates, said third plate defining a work engaging notch on the lower edge thereof, said work engaging plates all being held in parallel planes.

3. A gauge for determining the eccentricity of crank shafts and the like comprising a base member having spaced parallel work engaging plates secured thereto and defining similar work engaging notches on the lower edges thereof, a supporting bar slidably supported on the said base member for motion parallel to said work engaging plates, said supporting bar and base member having cooperative measuring indicia thereon, a connecting member extending normally from said supporting member, and a third work engaging member secured to said connecting member in parallel relationship to said other work engaging member, said third work engaging member defining a notch on the lower edge thereof.

4. A gauge for determining the throw of crank shafts and the like comprising, a pair of work engaging members having opposed parallel faces with work engaging notches therein, a connecting bar slidably mounted on one of said members for longitudinal movement in a plane parallel to the planes of said faces, said connecting bar and said one of said members having cooperative measuring indicia thereon, and an arm extending at an angle from said bar and supporting the other of said members in parallel relationship with said one of said members with the adjacent faces of said members in laterally spaced planes, at least one of said members being of substantial thickness whereby the notch therein engages the work in gauge aligning relationship along the length of the work.

5. A gauge for determining the throw of crank shafts and the like comprising, a pair of work engaging members having opposed faces with work engaging notches therein, a connecting bar slidably mounted on one of said members for longitudinal movement transversely with respect to the notch therein, and an arm extending at an angle from said bar and supporting the other of said members with the edges of the notch in said other member in parallel relationship with the edges of the notch in said one of said members and with the opposed faces of said members in laterally spaced relation, at least one of said members being of substantial thickness whereby the notch therein engages the work in gauge aligning relationship along the length of the work.

RUSSELL J. LAMKIN.

REFERENCES CITED

The following references are of record in the file of this patent:

UNITED STATES PATENTS

| Number | Name | Date |
| --- | --- | --- |
| 410,414 | Hall | Sept. 3, 1889 |
| 550,061 | Simpson | Nov. 19, 1895 |
| 563,089 | Strange | June 30, 1896 |
| 1,598,248 | Paine | Aug. 31, 1926 |